United States Patent
Wilinski et al.

(10) Patent No.: US 7,110,453 B1
(45) Date of Patent: Sep. 19, 2006

(54) MOTION OR DEPTH ESTIMATION BY PRIORITIZING CANDIDATE MOTION VECTORS ACCORDING TO MORE RELIABLE TEXTURE INFORMATION

(75) Inventors: Piotr Wilinski, Eindhoven (NL); Cornelis W. A. M. Van Overveld, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 1367 days.

(21) Appl. No.: 09/241,957

(22) Filed: Feb. 2, 1999

(30) Foreign Application Priority Data

| Feb. 6, 1998 | (EP) | ................... 98200358 |
| Jul. 7, 1998 | (EP) | ................... 98202285 |

(51) Int. Cl.
*H04N 7/12* (2006.01)

(52) U.S. Cl. ................................. 375/240.16

(58) Field of Classification Search ........... 375/240.01, 375/240.08, 240.16, 240.24; 348/578; H04N 7/12
See application file for complete search history.

(56) References Cited

U.S. PATENT DOCUMENTS 6,026,195 A * 2/2000 Eifrig et al. ................ 348/578

* cited by examiner

*Primary Examiner*—Young Lee

(57) ABSTRACT

In a motion or depth estimation method, a set (CS) of candidate motion vectors, or depth values formed by already obtained motion vectors, or depth values for neighboring image parts which are spatio-temporally adjacent to a given image part of interest, is generated (MV-MEM) for the given image part of interest. Those candidate motion vectors or depth values which correspond to neighboring image parts containing more reliable texture information than other neighboring image parts, are prioritized (TBPD) to obtain a prioritized set (PCS) of candidate motion vectors or depth values. Thereafter, motion or depth data (MV) for the given image part of interest is furnished (ME) in dependence upon the prioritized set (PCS) of candidate motion vectors or depth values. Finally, an image signal processing device (ISPD) processes an image signal (Iin) to obtain an enhanced image signal in dependence upon the motion or depth data (MV).

10 Claims, 1 Drawing Sheet

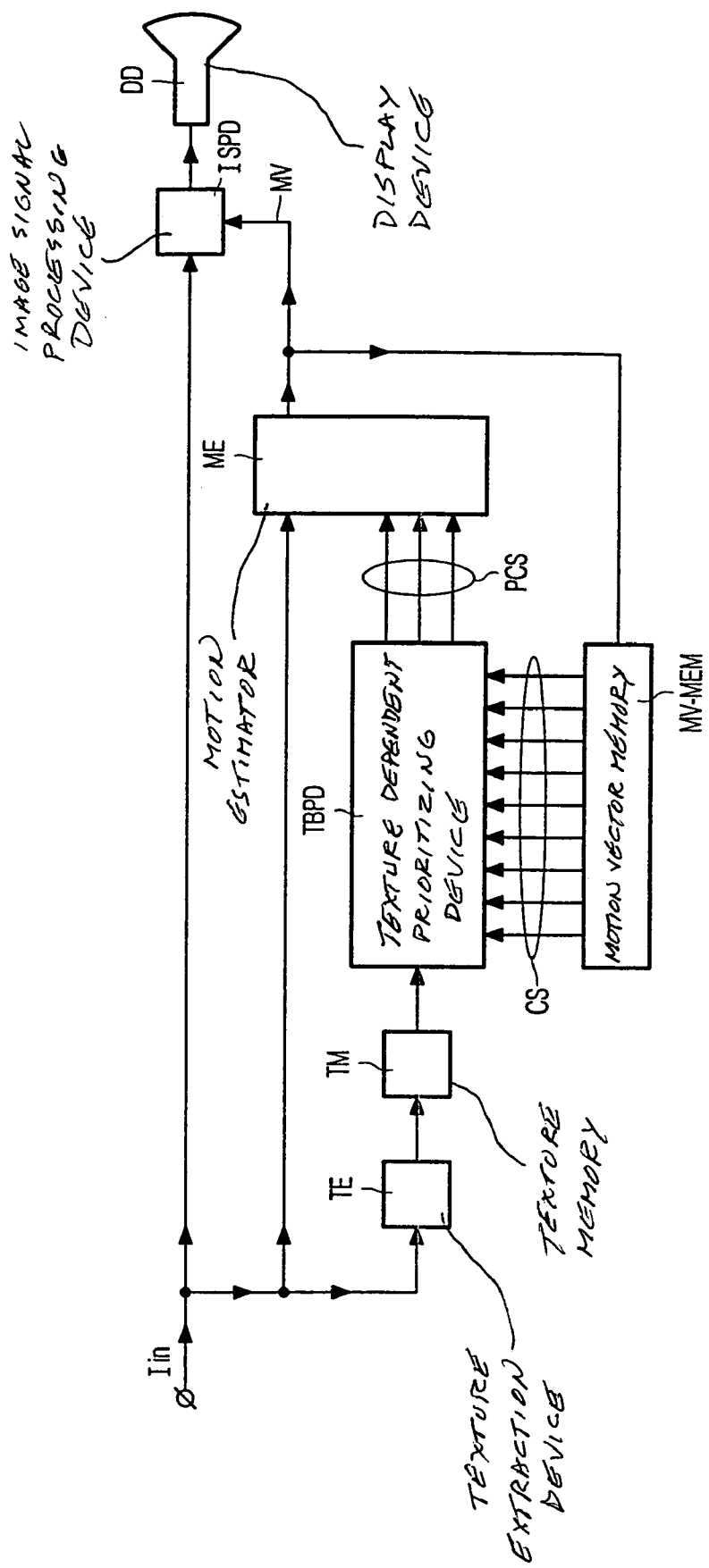

MOTION OR DEPTH ESTIMATION BY PRIORITIZING CANDIDATE MOTION VECTORS ACCORDING TO MORE RELIABLE TEXTURE INFORMATION

BACKGROUND OF THE INVENTION

1. Field of the Invention

The invention relates to motion or depth estimation.

2. Description of the Related Art

Block matching has been used with success in video coding applications (see Refs. 3 and 4) for displacement estimation and movement compensation. Block matching algorithms are iterative minimization algorithms which assume that all pixels within a given block move uniformly, say with vector (ij). If, for that block, we minimize the Mean Squared Error (MSE) with respect to (ij), we can find, after convergence, the most likely motion for that block from time t to t+1.

$$MSE(i, j) = \frac{1}{MN}\sum_{m=1}^{M}\sum_{n=1}^{N}[U_{t+1}(m, n) - U_t(m + i, n + j)]^2 \quad (1)$$

Here, M,N are the dimensions of the block in pixels. Ut(m,n) is the pixel intensity of a scene at time t, at the location (m,n). The (i,j)'s are taken from a set of candidates: CS. The minimal value of MSE over CS is called the matching penalty (MP).

In a method proposed by G. de Haan in Ref. 5, which we refer in this text as the standard solution or the original algorithm, the candidate set consists of values taken from a given arrangement of neighbors. This known arrangement is optimized to enable an efficient hardware implementation.

SUMMARY OF THE INVENTION

It is, inter alia, an object of the invention to provide a better motion or depth estimation. To this end, a first aspect of the invention provides a motion-estimation method and device for estimating motion. A second aspect of the invention provides methods of and a device for extracting depth information from motion. A third aspect of the invention provides an image display apparatus including such a motion estimating device or a depth information extracting device.

In a motion or depth estimation method in accordance with a primary aspect of the invention, a set of candidate motion vectors, or depth values formed by already obtained motion vectors, or depth values for neighboring image parts which are spatio-temporally adjacent to a given image part of interest, is generated for the given image part of interest. Those candidate motion vectors or depth values which correspond to neighboring image parts containing more reliable texture information than other neighboring image parts, are prioritized to obtain a prioritized set of candidate motion vectors or depth values. Thereafter, motion or depth data for the given image part of interest is furnished in dependence upon the prioritized set of candidate motion vectors or depth values. This can be done in the prior art manner by selecting that candidate motion vector or depth value which results in the lowest match error for the given image part of interest, possibly after adjusting the candidate motion vector or depth values set (by adding additional candidate motion vectors or depth values obtained) by adding small updates to the existing candidate motion vectors or depth values. Finally, an image signal processing device processes an image signal to obtain an enhanced image signal in dependence upon the motion or depth data.

These and other aspects of the invention will be apparent from and elucidated with reference to the embodiments described hereinafter.

BRIEF DESCRIPTION OF THE DRAWING

In the drawing, the sole Figure shows a block diagram of an embodiment of an image display apparatus in accordance with the present invention.

DESCRIPTION OF THE PREFERRED EMBODIMENTS

In this description, a block matching algorithm is proposed which differentiates between blocks depending on the reliability of the texture information. Block matching techniques are presented in the domain of motion estimation, and it is noted how these can be applied to depth reconstruction. Next, the notion of "confidence" is introduced, and it is explained how informational entropy and matching quality in concert can lead to reliable block matching. This idea is an alternative to different reliability measures expressing the estimation depth/motion vectors quality (see Refs. 6 and 7). Further, the new Confidence Based Block Matching (CBBM) algorithm is introduced. Finally, experimental results illustrating the benefit of this method are given.

The subject algorithm (which is implemented in software) is a modification of the standard solution (Ref. 5) in the following respects:

The notion of a small CS is kept rather than a full area search in order to arrive at efficient convergence. However in the subject algorithm, the shape of the CS will not be constan,t but it will be based on the notion of confidence as explained below.

In an application of the present invention to depth estimation, the values in the CS will be depth values rather than motion vectors (ij); however, for a given camera motion, a depth value can be uniquely translated into its associated apparent motion.

The accuracy of the motion or depth estimation depends on the quality of the underlying texture. The texture in some regions of the image may be low. It is not possible to give a high confidence to the motion or depth values obtained in such regions for obvious reasons. As a consequence, regions equidistant to the viewer could result in different values of the depth estimates. To avoid this, the propagation of the motion or depth value should be controlled, e.g., by the assumed quality of the motion or depth estimation. This is especially relevant for the case of adjacent blocks with very different texture qualities. This idea is implemented by introducing a quantity called "confidence". In a preferred embodiment, for a given block, the confidence C(t) at time t is:

$$C(t) = \frac{Ent}{MP(t)} \quad (2)$$

where Ent is the informational entropy (see Ref. 8). For the first iteration, MP(t) is given a constant value for all blocks. The informational entropy Ent is given by:

$$Ent = \sum_{x=0}^{NG-1} \sum_{y=0}^{NG-1} g(x, y) * \text{Log } g(x, y) \qquad (3)$$

where the g(x,y) are the elements of a Gray Level Co-occurrence Matrix, and NG is the number of gray levels in the image. The Co-occurrence matrix expresses the probability of the co-occurrences of certain pixel pairs (Ref. 8). Instead of informational entropy as defined here, spatial variance can be used.

The confidence could also be influenced by other image features. For example, the use of an edge map, and the a posteriori motion or depth error computation were considered, but have not led to any improvements.

The use of the notion of confidence C(t) to obtain candidate sets CS that take into account the local differences in match quality is herein explained. One iteration of the CBBM algorithm comprises the following steps. First, make CS contain the values in the block of interest plus the values in its 8 neighboring blocks. Then, the values in the K blocks with lowest C(t) are removed from CS, 0<K<8. As in the standard solution (Ref. 5), CS is extended with one random value, and for the resulting final 9−K+1 values in the prioritized candidate set PCS, the optimal candidate (according to MSE) is selected. Note that the central block (of interest), which is contained in the initial CS, is not necessarily included in the final set.

It is observed that for K less than 5, the prioritized candidate set PCS is larger than in the original algorithm (Ref. 5), but it is much better adjusted to the local match quality.

Experiments have been done using a doll-house sequence. Interlaced frames are taken into account. Iterations of the CBBM algorithm lead to the convergence of the matching error, which is the sum of MP for all blocks, and to the convergence of the motion or depth estimates.

Modifying K influences the convergence of the algorithm. In general, for all values of K (0 . . . 8), the number of required iterations is smaller than in the original algorithm (Ref. 5). 2 to 3 iterations are needed, while the standard solution needed 5 to 8. In order to get this fast convergence, the visiting/updating order of the blocks is important. A strategy where the blocks are updated in the order of decreasing confidence turns out to work best. Further, if K=0 (ignoring confidence), a single iteration step takes longer. The result is stable, and convergence is monotone. If K increases, a single iteration step is faster, but the matching error and the motion or depth assignments may display oscillatory convergence. The best results are obtained for a candidate set consisting of 4 blocks (3 neighbors+a random modified block). It is observed that the CBBM algorithm gives less noisy motion or depth values.

A preferred application of this invention addresses the problem of the extraction of depth from motion. From a video image sequence, depth information is extracted using an iterative block matching algorithm. The accuracy and the convergence speed of this algorithm are increased by introducing Confidence Based Block Matching (CBBM) as explained above. This new method is based on prioritizing blocks containing more reliable texture information.

The following problem is considered: given a video sequence of a static scene taken by a camera with known motion, depth information should be recovered. All apparent motion in the video sequence results from parallax. Differences in motion between one region and another indicate a depth difference. Indeed, analyzing two consecutive frames, the parallax between a given picture region at time t and the same region at t+1 can be computed. This parallax corresponds to the motion of different parts of the scene. Objects in the foreground move more than those in the background. By applying geometrical relations, the depth information can be deduced from the motion.

All surfaces in the scene are assumed to be non-specular reflective, and the illumination conditions are assumed to be approximately constant. The texture is supposed to be sufficiently rich.

This problem has received ample attention in the literature: in particular both feature based (Ref. 1) and block based (Ref. 2) techniques have been proposed. The advantage of the feature based methods is that they can cope with large frame-to-frame camera displacements. However, they require the solution of the feature matching problem, which is computationally complex. To avoid feature matching, the subject invention will focus on block-based techniques.

A new block matching algorithm for the depth from motion depth estimation was proposed. The CBBM method is based on prioritizing blocks containing more reliable texture information. It is proposed to attribute a confidence measure to each block depending on the matching quality and the informational entropy. The accuracy of the motion or depth estimation and the convergence speed of the algorithm are better than the standard solution.

The Figure shows an embodiment of an image display apparatus in accordance with the present invention. An image signal Iin is applied to an image signal processing device ISPD to obtain an enhanced image signal having an increased line and/or field rate. The enhanced image signal is displayed on a display device DD. The processing effected by the image signal processing device ISPD depends on motion vectors MV generated by a motion estimator ME. In one embodiment, the image signal processing device ISPD generates depth information from the motion vectors MV, and processes the image signal Iin in dependence on the depth information.

The image signal Iin is also applied to the motion estimator ME and to a texture extraction device TE. An output of the texture extraction device TE is coupled to a texture memory TM. Motion vectors MV estimated by the motion estimator ME are applied to a motion vector memory MV-MEM to supply a set CS of candidate motion vectors. A texture dependent prioritizing device TBPD prioritizes the set CS of candidate motion vectors to obtain a prioritized set PCS of candidate motion vectors. The motion estimator ME estimates the motion vectors MV on the basis of the image signal Iin and the prioritized set PCS of candidate motion vectors.

A further aspect of the invention provides a motion estimating method comprising the steps of:

generating a set PCS of N−K candidate motion vectors containing motion vectors for a block of interest and N-1 blocks adjacent to said block of interest excluding motion vectors for K blocks having a lower confidence quantity C(t) than the N−K other blocks; and furnishing motion information in dependence on said set PCS of N−K motion vectors.

Preferably, the motion information furnishing step includes the steps of:

adding a random value to said set PCS of N−K motion vectors; and selecting an optimal candidate from the resulting set of N−K+1 motion vectors.

Preferably, blocks are updated in the order of decreasing confidence quantity, whereby blocks containing more reliable texture information are prioritized.

Preferably, the confidence quantity C(t) depends on matching quality and/or informational entropy.

Yet another aspect of the invention provides a method of extracting depth information from motion, the method comprising the steps of:
estimating motion as defined in the previous aspect of the invention; and
generating depth information from the motion information.

It should be noted that the above-mentioned embodiments illustrate rather than limit the invention, and that those skilled in the art will be able to design many alternative embodiments without departing from the scope of the appended claims. The notions "neighboring" and "adjacent" are not limited to "directly neighboring" and "directly adjacent", respectively; it is possible that there are image parts positioned between a given image part of interest and a neighboring image part. The notion "already obtained motion vectors for neighboring image parts which are spatio-temporally adjacent to an image part of interest" includes motion vectors obtained during a previous field or frame period. The word "comprising" does not exclude the presence of other elements or steps than those listed in a claim. The invention can be implemented by means of hardware comprising several distinct elements, and by means of a suitably programmed computer. In the device claims enumerating several means, several of these means can be embodied by one and the same item of hardware.

REFERENCES (1) T.-S. Jebara; A. Pentland, "Parametrized structure from motion for 3D adaptive feedback tracking of faces", CVPR '97, San Juan, Puerto Rico, pp. 144–50, June 1997.

(2) T. Yoshida, H. Katoh, Y. Sakai, "Block Matching Motion Estimation using Block Integration based on Reliability Metric", ICIP '97, pp. 152–155, 1997.

(3) JR. Jain, A. K. Jain, "Displacement Measurement and its Application in Interframe Image Coding", IEEE Trans. On Communication, Vol. COM-29(12), pp. 1799–1808, December 1981.

(4) K.-H. Tzou, T. R. Hsing, N. A. Daly, "Block-Recursive matching Algorithm (BRMA) for Displacement Estimation of Video Images", ICASSP '85, pp. 359–362, 1985.

(5) G. de Haan, P. Biezen, "Sub-pixel motion estimation with 3D recursive search block matching", Signal Processing: Image Communication 6, 1994, pp. 229–239.

(6) R. Szeliski, S. B. Kang, "Recovering 3D Shape and Motion from Image Streams using Non-Linear Least Squares", Cambridge Research Laboratory, Technical Report CRL 93/3, March 1993.

(7) R. Szeliski, S. B. Kang, H-Y Shum, "A Parallel Feature Tracker for extended Image Sequences", IEEE Symposium on Computer Vision, Coral Gables, Fla., pp. 241–246, November 1995.

(8) R. M. Haralick, K. Shanmugam, I. Dinstein, "Textural Features for Image Classification", IEEE Trans. on Systems, Man and Cybernetics, vol. SMC-3, no.6, pp. 610–2 1, November 1973.

What is claimed is:

1. A motion estimation method, comprising the steps:
generating, for a given image part of interest, a set of candidate motion vectors formed by already obtained motion vectors for neighboring image parts which are spatio-temporally adjacent to said given image part of interest;
prioritizing those candidate motion vectors which correspond to neighboring image parts containing more reliable texture information than other neighboring image parts, to obtain a prioritized set of candidate motion vectors; and
furnishing motion data for said given image part of interest in dependence upon said prioritized set of candidate motion vectors.

2. A motion estimating method as claimed in claim 1, wherein:
said prioritizing step comprises generating a set of N–K candidate motion vectors for N–K blocks from a set of N motion vectors for N blocks including motion vectors for a block of interest and N–1 blocks spatio-temporally adjacent to said block of interest, said N–K candidate motion vectors being formed by excluding K motion vectors for K blocks having lower confidence quantities than confidence quantities for a remaining N–K motion vectors for a remaining N–K other blocks, where N and K are integers and N>K; and
said motion data furnishing step comprises furnishing motion information in dependence on said set of N–K motion vectors.

3. A motion estimating method as claimed in claim 2, wherein said motion information furnishing step includes:
adding a random value to said set of N–K motion vectors thereby forming a set of N–K+1 motion vectors; and
selecting an optimal candidate from said set of N–K+1 motion vectors.

4. A motion estimating method as claimed in claim 2, wherein blocks are updated in the order of decreasing confidence quantity.

5. A motion estimating method as claimed in claim 2, wherein said confidence quantity depends on matching quality and/or informational entropy.

6. A method of extracting depth information from motion, the method comprising the steps:
estimating motion data as claimed in claim 1; and
generating depth information from the motion data.

7. A depth estimation method, comprising the steps:
generating, for a given image part of interest, a set of candidate depth values formed by already obtained depth values for neighboring image parts which are spatio-temporally adjacent to said given image part of interest;
prioritizing those candidate depth values which correspond to neighboring image parts containing more reliable texture information than other neighboring image parts, to obtain a prioritized set of candidate depth values; and
furnishing depth data for said given image part of interest in dependence upon said prioritized set of candidate depth values.

8. A motion estimation device, comprising:
means for generating, for a given image part of interest, a set of candidate motion vectors formed by already obtained motion vectors for neighboring image parts which are spatio-temporally adjacent to said given image part of interest;
means for prioritizing those candidate motion vectors which correspond to neighboring image parts containing more reliable texture information than other neighboring image parts, to obtain a prioritized set of candidate motion vectors; and means for furnishing motion data for said given image part of interest in dependence upon said prioritized set of candidate motion vectors.

9. A depth estimation device, comprising:

means for generating, for a given image part of interest, a set of candidate depth values formed by already obtained depth values for neighboring image parts which are spatio-temporally adjacent to said given image part of interest;

means for prioritizing those candidate depth values which correspond to neighboring image parts containing more reliable texture information than other neighboring image parts, to obtain a prioritized set of candidate depth values; and means for furnishing depth data for said given image part of interest in dependence upon said prioritized set of candidate depth values.

10. An image display apparatus, comprising:

a motion estimation device as claimed in claim 8 for furnishing motion data;

an image signal processing device for processing an image signal to obtain an enhanced image signal in dependence upon said motion data; and a display device for displaying the enhanced image signal.

* * * * *